F. L. BISHOP.
METHOD OF DRAWING HOLLOW GLASS ARTICLES.
APPLICATION FILED MAY 13, 1914.
1,142,139.
Patented June 8, 1915.
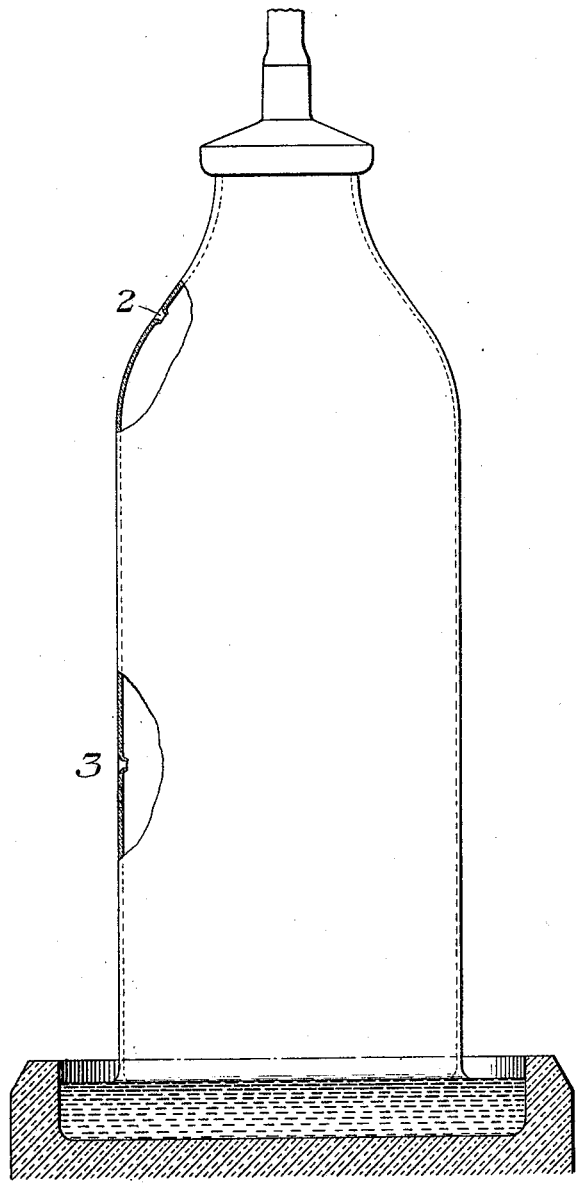
WITNESSES
INVENTOR

UNITED STATES PATENT OFFICE.

FREDERIC L. BISHOP, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY.

METHOD OF DRAWING HOLLOW GLASS ARTICLES.

1,142,139.     Specification of Letters Patent.     Patented June 8, 1915.

Application filed May 13, 1914. Serial No. 838,203.

*To all whom it may concern:*

Be it known that I, FREDERIC L. BISHOP, a citizen of the United States, and a resident of Pittsburgh, in the county of Allegheny and State of Pennsylvania, have invented a new and useful Method of Drawing Hollow Glass Articles, of which the following is a full, clear, and exact description, reference being had to the accompanying drawing, forming part of this specification, in which the figure is an elevation, more or less conventional, illustrating the method of my invention.

My invention has relation to the drawing of hollow glass articles in accordance with the well known Lubbers process, in which a hollow bait or blow-pipe is lowered into a bath of molten glass and then drawn upwardly with the glass adhering thereto, air being admitted to the interior of the article during the drawing operation. This process is generally described in the Lubbers Patent No. 702,014 of June 10, 1902. In the practice of this method it was found necessary to provide the blow-pipe or bait with a constantly open small air outlet for the purpose of equalizing the pressure in the article being drawn and keep it substantially uniform. It was found that this vent was necessary by reason of the expansion and contraction of the air within the article during the drawing operation, and which resulted in a "breathing" or pulsating action of the cylinder. This vent opening is described and claimed in the Lubbers Patent No. 886,618 of May 5, 1908. I have now discovered that the same automatic regulating action may be obtained by forming the vent opening in the wall of the article itself, instead of in the blow-pipe or bait.

In accordance with my invention, after the drawing operation is started, and preferably after the usual neck and cap portion of the article have been formed, I make one or more small perforations through the glass wall of the article in the neck or cap portion. This acts as the automatic vent or regulator during the remainder of the draw. The perforation may be formed in any manner of perforating glass known to the art, as by a suitable punching tool, blow-torch, etc. By forming this perforation in the neck or cap portion of the article, the vent is provided during all portions of the drawing in which it is necessary, and, furthermore, is formed in a part of the article which is always cut off in the operation of capping-off the drawn article, so that no loss of glass is occasioned thereby. I may, however, form this perforation at any desired point in the wall of the article. If desired, two or more perforations may be formed through the wall of the article being drawn at different levels, as at 2 and 3 in the accompanying drawing.

My invention obviates the necessity of providing the blow-pipe or baits with special vent openings, as well as the necessity for more or less careful attendance on the part of the operator to see that these openings are kept free and unobstructed. The perforation or perforations in the article itself can be made by the blower or other attendant of the proper size to suit the particular character of article being drawn in each case, as to wall thickness, etc., as well as to suit the different conditions and kinds of glass. By putting the vent in the article itself, I also obtain a better circulation of the air, since all the air coming through the supply pipe is compelled to enter the article before any of it can escape at the vent. This prevents any mixing of the ingoing and outgoing air and consequently gives a more uniform pressure. This gives a greater uniformity in the size and wall thickness of the article being drawn.

I claim:

1. The method of drawing hollow glass articles, which consists in immersing a bait in a bath of molten glass and drawing the article therefrom, supplying gaseous fluid to the interior of the article during the drawing operation, and forming a vent opening in the wall of said article to allow a portion of such fluid to escape through such opening during the drawing operation, substantially as described.

2. The method of drawing hollow glass articles, which consists in immersing a bait in a bath of molten glass and drawing the article therefrom, supplying gaseous fluid to the interior of the article during the drawing operation, and forming a plurality of vent openings in the wall of said article at different levels to allow a portion of such fluid to escape through such openings during the drawing operation, substantially as described.

3. The method of drawing hollow glass articles, which consists in immersing a bait in a bath of molten glass and drawing the article therefrom, supplying gaseous fluid to the interior of the article during the drawing operation, and forming a vent opening in the wall of said article during the initial portion of the drawing operation to allow a portion of such fluid to escape through such opening during the remainder of the drawing operation, substantially as described.

In testimony whereof, I have hereunto set my hand.

FREDERIC L. BISHOP.

Witnesses:
GEO. H. PARMELEE,
H. M. CORWIN.